March 21, 1961 — H. LÜNIG — 2,976,453
ARC FURNACE ELECTRODE CONTROL MEANS
Filed May 28, 1959
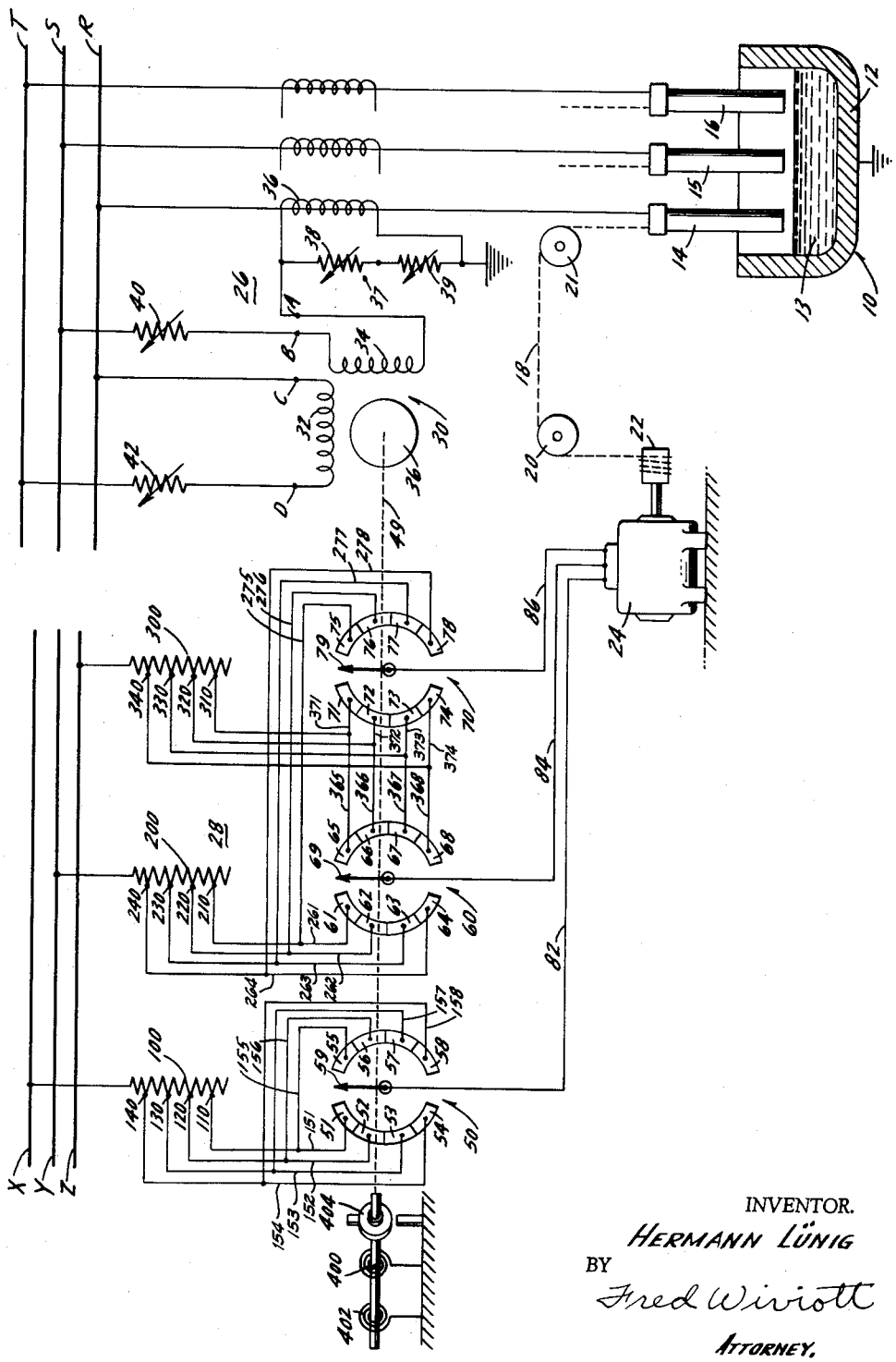
INVENTOR.
HERMANN LÜNIG
BY Fred Wiviott
ATTORNEY.

United States Patent Office 2,976,453
Patented Mar. 21, 1961

2,976,453

ARC FURNACE ELECTRODE CONTROL MEANS

Hermann Lünig, Duisburg, Germany, assignor to Demag-Elektrometallurgie G.m.b.H., Duisburg, Germany, a corporation of Germany Filed May 28, 1959, Ser. No. 816,440

Claims priority, application Germany July 14, 1958

2 Claims. (Cl. 314—69)

This invention relates to electric arc furnaces and more particularly to apparatus for controlling the position of electric arc furnace electrodes.

It is common practice in the production of high grade steel to utilize polyphase electric arc furnaces having a plurality of electrodes and electrode positioning means associated with each of the electrodes. The current flow in such furnaces is from the electrodes to the furnace charge and then to one of the other electrodes or to ground. That portion of the current path between the electrodes and the furnace charge comprises an arc, which provides the heat necessary for furnace operation.

Electrode positioning means are generally adapted to position each of the electrodes in accordance with the length of its respective arc as indicated by its arc current and arc voltage, so that when the arc current rises, indicating that the arc is too short, the electrode is raised and when the arc voltage rises, indicating that the arc is too long, the electrode is lowered. Generally, this is acomplished by deriving electrical signals which are proportional to the currents and voltages existing in any given phase and utilizing them for the operation of either electro-hydraulic or electro-mechanical lifting devices. Prior art electro-hydraulic and electro-mechanical electrode control systems, however, have proven unsatisfactory for use with small arc furnaces because of their relatively high cost. In addition, the electro-hydraulic type of system, in which the derived signals are utilized to position a control valve, suffers the further disadvantage when utilized in small installations of having very high inertia and therefore a very slow speed of response. For these reasons, most small electric arc furnaces are not provided with automatic electrode positioning means.

It is a primary object of the invention to provide electrode control means which is particularly but not exclusively useful in small electric arc furnace installations.

It is another object of the invention to provide arc furnace electrode control means which are relatively inexpensive but have a high degree of accuracy and a relatively fast speed of response.

Other objects and advantages of the invention will become apparent from the detailed description thereof taken in view of the drawings in which Fig. 1 schematically illustrates a preferred embodiment of the invention.

In general terms, the invention comprises electric arc furnace electrode positioning means having signal comparison means connected to said electrode for producing an output whose magnitude and direction is a function of the relative sizes of the electrode current and voltage, electro-responsive means for positioning said electrodes, and means connected to said signal comparison means for controlling the magnitude and sense of the electrical energy flowing to the electro-responsive electrode positioning means. In the preferred embodiment of the invention, the signal comparison means comprises a reversible two phase induction control motor whose windings are disposed at 180° relative to each other and which are respectively supplied by voltages proportional to the voltage and current in its associated electrode. The electro-responsive electrode positioning means may comprise, for example a three phase induction positioning motor which mechanically positions the electrode, in any suitable manner such as pulley and drum arrangement. The energy control means is electrically disposed between the three phase induction positioning motor and its source of three phase energy and is mechanically coupled to the reversible control motor so that it will be varied by said control motor in accordance with the variations in electrode current and voltage. The variations control the magnitude and phase sequence of the current flowing to the electrode positioning motor.

The single figure of the drawing illustrates applicant's control system.

Referring now to the drawing in greater detail, an electric arc furnace 10 is illustrated having a shell 12 containing a bath of molten furnace charge 13 and three movable electrodes 14, 15 and 16 positioned above the melt 13. Electrodes 14, 15 and 16 are connected to three phase supply conductors R, S, and T respectively, which are, in turn, connected to a suitable source of three phase power (not shown). Any suitable means such as a flexible cable 18 and pulleys 20 and 21 are provided for raising and lowering each of the electrodes in accordance with furnace conditions in a manner to be described in the ensuing paragraphs. It will be understood that because identical operating mechanisms are provided for controlling the positioning of each electrode, only one such mechanism as illustrated in the drawing for the sake of brevity although in actuality, three would be provided. It can be seen that the flexible cable 18 is wound upon a winding drum 22 operated by a reversible three phase induction motor 24 so that the position of electrode 14 relative to the furnace melt 13 will be dependent upon the angular position of the rotor of motor 24. This angular position will, in turn, be dependent upon the magnitude and the phase sequence of its three phase supply current.

The electrode control means also includes voltage comparison means 26 for producing an output whose magnitude and sense is proportional to the relative sizes of the voltage and current existing in electrode 14 and energy control means 28 coupled to said voltage comparison means for controlling the magnitude and the phase sequence of the three phase power supply of the positioning motor 24 in accordance with the output signal from said voltage comparison means.

The voltage comparison means includes a two phase induction control motor 30 having electrode lowering and electrode raising field coils 32 and 34 respectively, which are wound at right angles to each other so that the flux produced as a result of the current flowing in them will be 180° out of phase. As a result, when the voltage across each of these coils is substantially equal, they will produce equal and opposite torques on rotor 36, so that it will remain stationary. Should the voltage across one of the coils rise above or fall below that of the other, rotor 36 will rotate in a direction and through an angle dictated by the direction and the magnitude of this deviation. These field coils are connected to the furnace power supply conductors R, S and T in such a manner that the voltage across lowering coil 32 will be proportional to the voltage of electrode 14 and the voltage across raising coil 34 will be proportional to the current flowing in supply conductor R.

Electrode current is sensed by means of a current transformer 36 whose secondary is inductively coupled to power supply conductor R and a voltage proportional to this current is derived by means of a shunting current divider 37 comprising adjustable resistors 38 and 39. One end of current divider 37 is connected to terminal A of electrode raising coil 34 while the other terminal B of said coil is connected to supply conductor S through an adustable resistor 40. It can be seen from this configuration that, neglecting losses, the voltage in winding 34 is equal to the S-to-ground voltage minus the voltage induced across voltage divider 37 by current transformer 36.

Terminal C of electrode lowering coil 32 is connected to supply conductor R while terminal D thereof is connected to supply conductor T through adjustable resistor 42. In this manner a substantially constant reference voltage is placed across lowering coil 32 while a variable voltage proportional to the electrode 14 current is placed across raising coil 34. It can be seen, therefore, that as current conditions in electrode 14 vary, the torque on rotor 36 will vary in magnitude and direction as a function of the amount that the electrode 14 current deviates from a predetermined desired value.

When electrode 14 is positioned at the desired height above furnace melt 13, the voltage across raising coil 32 and lowering coil 34 can be made equal by suitable adjustment of resistors 38, 39, 40 and 42 so that rotor 30 remains stationary. If the electrode current should thereafter rise, indicating that the arc gap is too small, the increased current in electrode 14 will cause the voltage across electrode raising coil 34 to exceed that which exists in electrode lowering coil 32. This results in a net torque on rotor 36 which, it will be assumed for the sake of illustration, causes rotation thereof in a counterclockwise direction. As will be discussed in greater detail hereinafter, this causes a raising of electrode 14 until it reaches a position wherein the electrode current again reaches its predetermined desired level. Upon this event, the voltage across lowering coil 32 will again be equal to the voltage across raising coil 34 so that opposing torques on rotor 30 will again cancel and electrode 14 will again come to rest. On the other hand, should the electrode 14 current fall below a predetermined desired value, indicating that the arc gap is too long, the voltage across raising coil 34 will fall below that of lowering coil 32 so that there will be a net clockwise torque on rotor 36. This causes rotor 36 to rotate in a clockwise direction resulting in a lowering of the electrode until the voltages in coils 32 and 34 are again balanced whereupon rotor 36 will again come to rest.

The positioning motor 24 power supply control means 28 includes a rotary tap changer 50, 60 and 70 in each of the positioning motor power supply phases X, Y and Z respectively, for changing the impedance in each of said phases and for controlling the phase sequence of said three phase power in accordance with the angular rotation of rotor 36. Each of the rotary tap changers 50, 60 and 70 includes a conductive brush 59, 69 and 79 respectively, which are mechanically connected to rotor 36 by means of shaft 49 so that said conductor brushes will rotate in the same direction and through the same angle as rotor 36.

Each of the rotary tap changers 50, 60 and 70 is provided with a plurality of stationary arc shaped contact members disposed equi-radially around the rotational axis of their respective conductive brushes 59, 69 and 79. The contacts of each tap changer are arranged in two groups, one being disposed on either side of a neutral or central portion so that rotation of rotor 36 in a clockwise direction will move the conductive brush of each tap changer from the neutral point onto the clockwise group of stationary contacts while movement of said rotor in a counterclockwise direction will move each of the conductive brushes from the neutral position onto their associated counterclockwise group. In the illustrated embodiment, each of the groups of stationary contacts in each tap changer includes 4 contact members, which are suitably insulated from each other. However, it is understood that any desired number of contacts may be utilized in each group, depending upon the degree of sensitivity desired.

For purposes of identification, the counterclockwise stationary contacts of each of the tap changers 50, 60 and 70 are numbered 51–54, 61–64 and 71–74 respectively while the clockwise stationary contact members of said tap changers are correspondingly numbered 55–58, 65–68 and 75–78 respectively.

Each of the conductive brushes 59, 69 and 79 are electrically connected to a different one of the phases of three phase electrode positioning motor 24 by conductors 82, 84 and 86 respectively, while the corresponding stationary contacts on either side of the neutral position of each of the tap changers 50, 60 and 70 are connected to corresponding taps on tapped impedances 100, 200 and 300 which are in turn respectively connected to phases X, Y and Z of the three phase positioning motor supply circuit. In this manner, as each of the conductive brushes 59, 69 and 79 are moved in either a clockwise or counterclockwise direction from their neutral positions, the impedance in each of the phases will change from infinity, wherein the motor is at rest to some finite value causing motor 24 to begin rotating and movement of electrode 14 thereby commenced. Further rotation of these conductive brushes in either direction which is sufficient to move it to a succeeding stationary contact, will further decrease the impedance in each of the phases whereby the positioning motor 24 will rotate more rapidly.

More specifically, the impedances 100, 200 and 300 in the phases X, Y, Z of the positioning motor 24 power supply circuit are respectively provided with taps 110, 120, 130, and 140; 210, 220, 230 and 240; and 310, 320, 330, and 340. The counterclockwise stationary contacts 51, 52, 53 and 54 of tap changer 50 are connected to taps 110, 120, 130, and 140 on impedance 100 by means of conductors 151, 152, 153 and 154 respectively. Similarly, correspondingly numbered conductors connect each of the counterclockwise stationary contacts on tap changes 60 and 70 to the corresponding taps on impedances 200 and 300. In a like manner, the clockwise stationary contacts 55, 56, 57 and 58 of tap changer 50 are connected to taps 110, 120, 130 and 140 of impedance 100 by conductors 155, 156, 157, and 158 respectively. On the other hand, clockwise stationary contacts 65, 66, 67, and 68 of tap changer 60 are connected to taps 310, 320, 330 and 340 of impedance 300 by conductors 365, 366, 367 and 368 respectively, rather than to the taps on impedance 200. Similarly, clockwise stationary contacts 75, 76, 77 and 78 of tap changer 70 are connected to taps 210, 220, 230 and 240 of impedance 200 by conductors 275, 276, 277 and 278 respectively. The purpose of these connections will become apparent from the ensuing discussion of the operation of the device.

When conductive brushes 59, 69 and 79 are in their neutral position as shown in the drawing, each of the phase conductors 82, 84 and 86 of electrode positioning motor 24 will be open circuited and the motor will be at rest. Assume however, that electrode 14 becomes too close to melt 13 so that the arc resistance decreases and the arc current increases causing an increased voltage to appear across raising coil 34 in the manner described hereinabove. This causes rotor 36 to rotate in a counterclockwise direction against the restoring force of a first restoring spring 400, which is connected to shaft 49, until each of the conductive brushes 59, 69 and 79 engage the first counterclockwise stationary contacts, 51, 61 and 71 respectively, thereby connecting phase conductors 82, 84 and 86 of electrode positioning motor 24 to taps 110, 210, and 310 respectively. This accomplishes two things. First, it insures that the maximum impedance will appear in each of the phases 82, 84 and 86 so that the motor 24 will turn at its slowest speed; and secondly, it connects phase conductors 82, 84 and 86 to phases X, Y, and Z respectively so that the phase sequence to said motor is X, Y, Z and a direction of motor 24 rotation will be assured which causes electrode 14 to be raised. It can be seen from the foregoing that if the electrode 14 current deviates a great deal from its desired value, the voltage in lowering coil 34 results in a torque on rotor 36 which is sufficient to rotate conductive brushes 59, 69, and 79 through a greater counterclockwise angle so that the second, third or fourth fixed contacts of each counterclockwise group will be engaged. This correspondingly decreases the impedance in each phase of motor 24 whereupon the motor will run at a greater speed and electrode 14 will be raised at a faster rate. It can be seen therefore, that the speed at which electrode 14 is raised depends upon the degree that its current deviates from a predetermined value. Accordingly when such deviations are large the electrode will be raised at a rapid rate while for small deviations the electrode will raise at a correspondingly slower speed.

Assume now that the position of electrode 14 above the furnace melt 13 becomes too high so that the electrode resistance increases and electrode current decreases below the predetermined desired value. Upon this event, the voltage across electrode raising coil 34 falls below the substantially constant voltage across electrode lowering coil 32 so that rotor 36 rotates in a clockwise direction against the restoring force of a second coil spring 402. The amount that the electrode 14 current deviates from the predetermined desired value will again determine the torque on rotor 36, and consequently, which of the clockwise stationary contacts of tap changers 50, 60, and 70 that conductive brushes 59, 69 and 79 will engage. If this deviation is small these conductive brushes will engage the first of said clockwise stationary contacts 55, 65, and 75 while larger deviations will cause said conductive brushes to engage succeeding contacts. If conductive brush 50 engages stationary contact 55, phase conductor 82 will again be connected to tap 110 on impedance 100 by conductor 155. However, phase conductor 84 will be connected to tap 310 on impedance 300 through conductor 365 while phase conductor 86 will be connected to tap 210 on conductor 200 by conductor 275. This again places the maximum impedance in each of the phases so that positioning motor 24 will rotate at its slowest speed. However, while conductor 82 is still connected to phase X, phase conductor 84 is now connected to phase Z through conductive brush 69, contact 65, conductor 365 and impedance 300 while phase conductor 86 is now connected to phase Y through conductive brush 79, contact 75, conductor 275 and impedance 200. As a result, the phase sequence to electrode positioning motor 24 is X, Z, Y, rather than X, Y, Z. Accordingly, the electrode positioning motor 24 will rotate in an opposite direction causing electrode 14 to be lowered.

In this manner, tap changers 50, 60 and 70 not only control the speed that electrode positioning motor 24 rotates in accordance with the amount that electrode 14 current deviates from a predetermined value but they also control the direction that said positioning motor rotates depending upon whether said deviation is above or below said predetermined value.

In order to prevent the conductive brushes from overtravelling in either direction, stop means 404 may be provided.

While only a single embodiment of the invention has been shown and described, it will be understood that certain portions of the invention may take other forms without deviating from the true spirit and scope of the invention. For example the electrode positioning motor 24 may comprise a D.C. motor and impedances 100, 200 and 300 may comprise a tapped transformer or a so-called liquid regulator. Accordingly, it is intended to cover in the appended claims all such modifications.

It is claimed:

1. Electrode positioning means for use in an electric arc furnace having electrode means and power supply means for energizing the same, the combination of signal responsive means connected to said electrode means for sensing the energy conditions therein and for producing an output torque whose magnitude and direction is a function of the deviation of said energy from a predetermined value, a source of polyphase electrical energy, reversible polyphase electroresponsive means connected to said source for positioning said electrodes, a plurality of energy dividing means each having a plurality of taps and each being connected in a different one of the phases of said electroresponsive means, and a tap changing means associated with each of said energy dividing means and each having a rotatable brush means and a plurality of contact means disposed on either side of a neutral center point and arranged to be sequentially engaged by its brush means upon rotation thereof, each of said brush means being electrically connected to one of the phases of said electroresponsive means and mechanically connected to said signal responsive means for simultaneous rotation by said output torque, and circuit means connecting the taps on said energy dividing means and the contacts of said tap changing means so that sequential engagement of said contact means on either side of said neutral point changes the magnitude of the energy supply to said electroresponsive means and so that the phase sequence of the energy delivered from said source to said electroresponsive means is reversed as said brush means cross their respective neutral points whereby deviations from a predetermined value in the energy flow to said electrode will result in the movement thereof by said electroresponsive positioning means in a direction tending to minimize said deviation.

2. Electrode positioning means for use in an electric arc furnace having electrode means and power supply means for energizing the same, the combination of signal comparison means connected to said electrode means for sensing the energy conditions therein and for producing an output signal whose magnitude and sense is a function of the deviation of said energy from a predetermined value, a source of three phase electrical energy, reversible three phase electroresponsive means connected to said energy source for positioning said electrodes, three resistance means each of which is connected to a different one of said phases of said electroresponsive means and each having a plurality of taps, a tap changing means associated with each of said resistance means and each of which has rotatable brush means and a plurality of contact means disposed on each side of a neutral center point and which are arranged for sequential engagement by their associated brush means upon rotation thereof, each of said brush means being electrically connected to one of the phases of said electroresponsive means and mechanically connected to said signal comparison means for simultaneous rotation by said output torque, circuit means connecting the taps on each of a pair of said resistance means to the contact means on one side of their individual associated tap changing means and also to the contact means on the other side of the tap changing means associated with the other resistance means of said pair, said circuit means also connecting the taps of the third one of said resistance means to the corresponding contact means on each side of its associated tap changing means, whereby the phase sequence of the energy flowing to said electroresponsive means is reversed as each of said brush means crosses its respective neutral point so that deviations from a predetermined value in the energy flow to said electrode will result in the movement of said electrode by said electroresponsive positioning means in a direction tending to minimize said deviation.

References Cited in the file of this patent

UNITED STATES PATENTS

| | | |
|---|---|---|
| 1,901,426 | Young | Mar. 14, 1933 |
| 2,419,988 | Davis | May 6, 1947 |